(12) United States Patent
Koyama et al.

(10) Patent No.: US 7,503,107 B2
(45) Date of Patent: Mar. 17, 2009

(54) METHOD FOR MANUFACTURING A MAGNETIC HEAD USING A MULTI-STAGE ION MILLING

(75) Inventors: Yoshihiko Koyama, Nagano (JP); Naoto Matono, Nagano (JP); Yasuyuki Notsuke, Tokyo (JP)

(73) Assignees: TDK Corporation, Tokyo (JP); SAE Magnetics (H.K.) Ltd., Shatin, N.T. (HK)

( * ) Notice: Subject to any disclaimer, the term of this patent is extended or adjusted under 35 U.S.C. 154(b) by 468 days.

(21) Appl. No.: 11/266,350

(22) Filed: Nov. 4, 2005

(65) Prior Publication Data

US 2006/0098339 A1 May 11, 2006

(30) Foreign Application Priority Data

Nov. 8, 2004 (JP) .............................. 2004-323977

(51) Int. Cl.
*G11B 5/127* (2006.01)
*G11B 5/147* (2006.01)

(52) U.S. Cl. ................. 29/603.18; 360/122; 360/125.03

(58) Field of Classification Search .............. 29/603.15, 29/603.16, 603.18; 360/122, 125.02, 125.03, 360/125.06, 125.09, 125.14, 125.19, 125.22
See application file for complete search history.

(56) References Cited

U.S. PATENT DOCUMENTS 6,741,421 B2  5/2004  Mochizuki et al.

2002/0131204 A1* 9/2002 Mochizuki et al. .......... 360/126
2004/0156142 A1  8/2004 Mochizuki et al.
2005/0219764 A1* 10/2005 Kameda et al. ............. 360/313
2006/0132972 A1* 6/2006 Tagami et al. ................ 360/126
2008/0019043 A1* 1/2008 Toma et al. .................. 360/110

FOREIGN PATENT DOCUMENTS

| JP | 2002-092820 A | 3/2002 |
| JP | 2002-279606 A | 9/2002 |
| JP | 2003-263705 A | 9/2003 |

* cited by examiner

*Primary Examiner*—William J Klimowicz
(74) *Attorney, Agent, or Firm*—Oliff & Berridge, PLC

(57) ABSTRACT

A method for manufacturing a magnetic head for perpendicular magnetic recording is disclosed. The method comprising: a first step of depositing a non-magnetic film over and around the main magnetic pole, and subsequently polishing and planarizing the non-magnetic film, wherein the non-magnetic film is made of a non-magnetic material which exhibits a lower ion milling rate than that of a magnetic metal material which constitutes the main magnetic pole; a second step of etching the surface by use of ion milling at a first angle relative to a stacked direction of the magnetic head, to form a stepped portion in which the main magnetic pole is lower from the non-magnetic film around the main magnetic pole; and a third step of etching the stepped portion, by use of ion milling, at a second angle relative to the stacked direction, wherein the second angle is larger than the first angle.

6 Claims, 19 Drawing Sheets

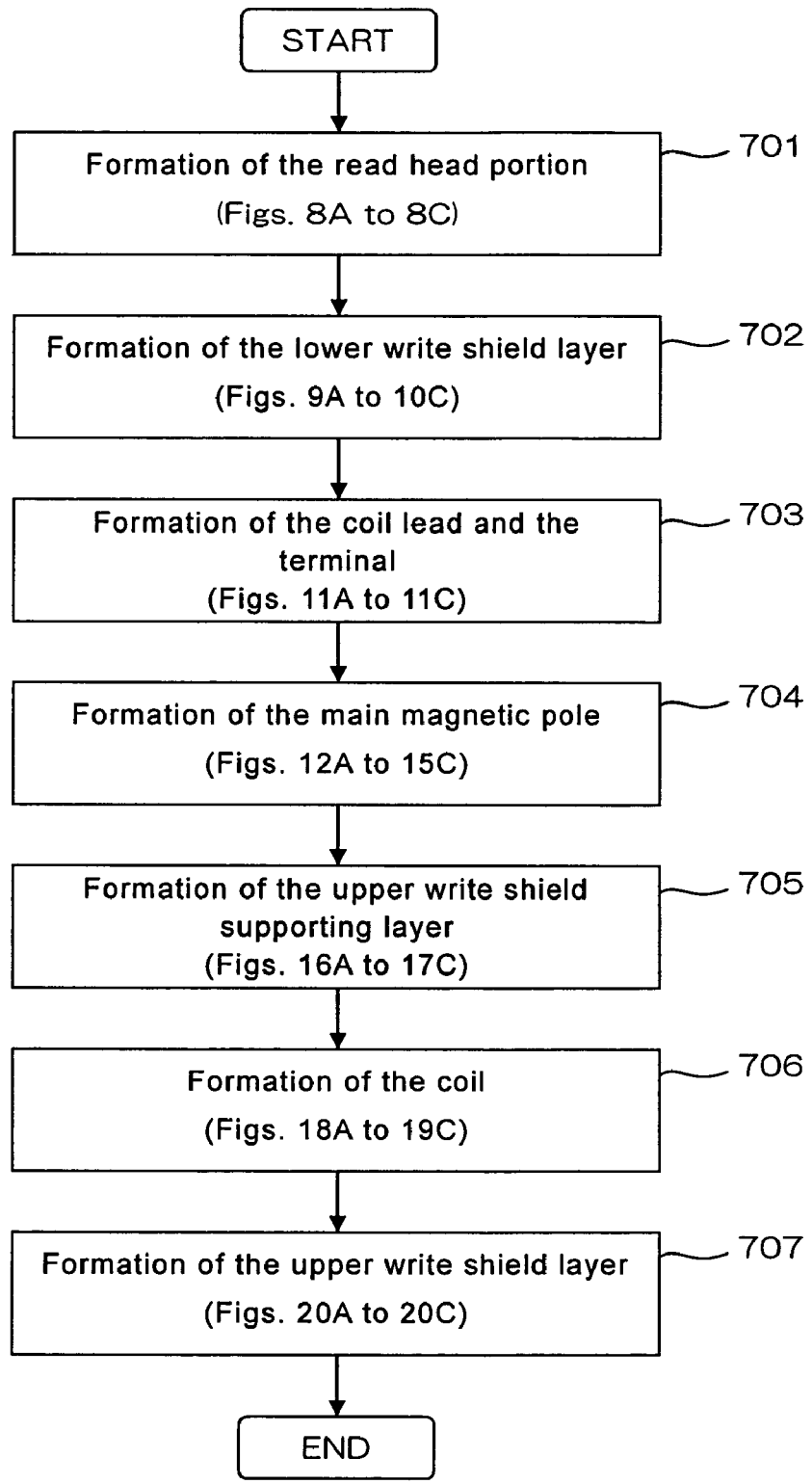

Air bearing surface

FIG.9A        FIG.9B
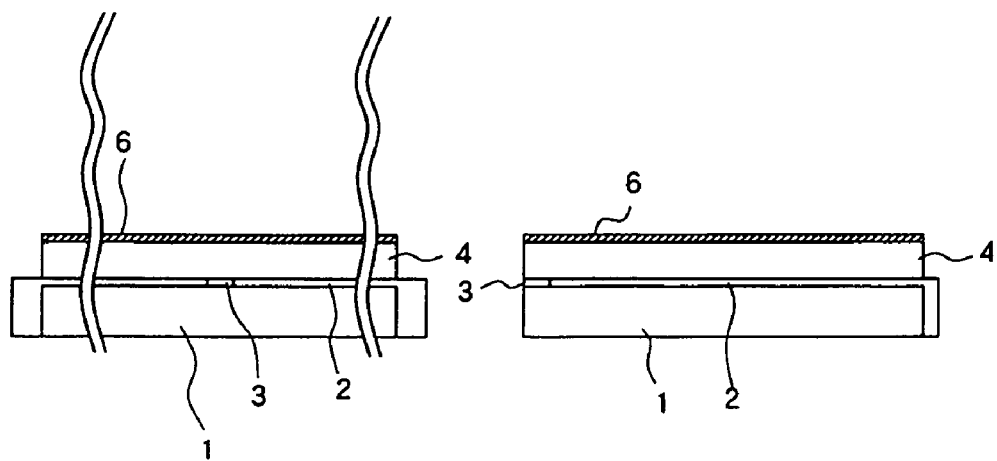
FIG.9C
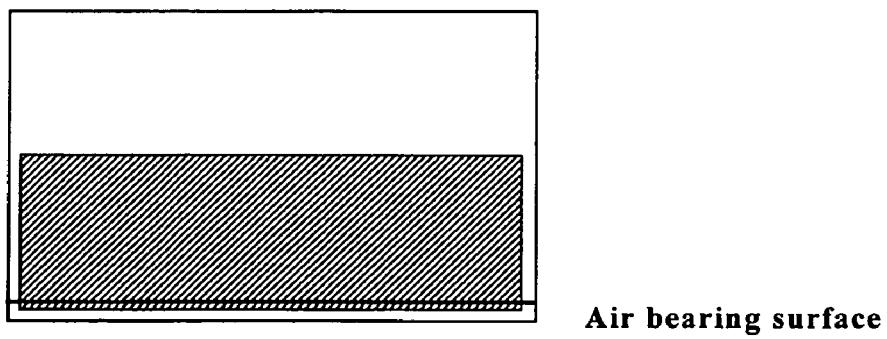
Air bearing surface Air bearing surface

FIG.11A                FIG.11B
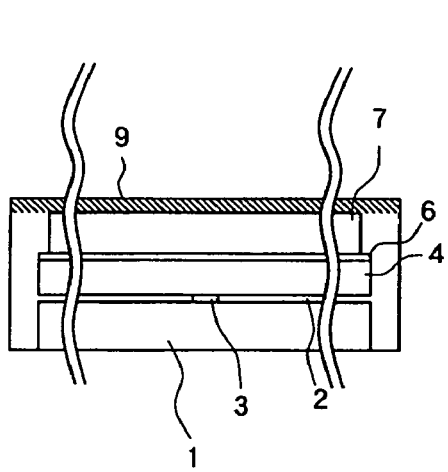 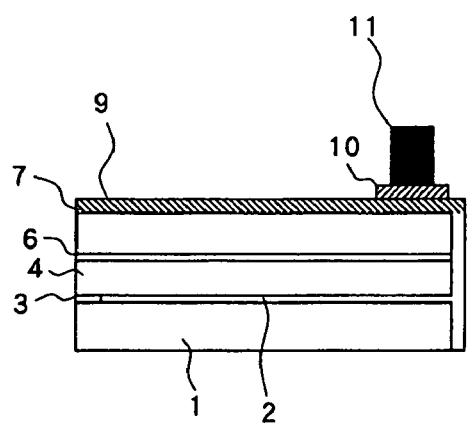
FIG.11C
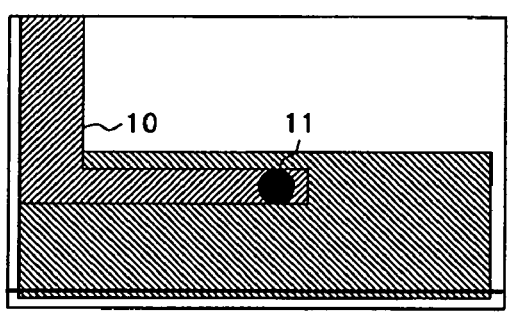
Air bearing surface

FIG.12A FIG.12B
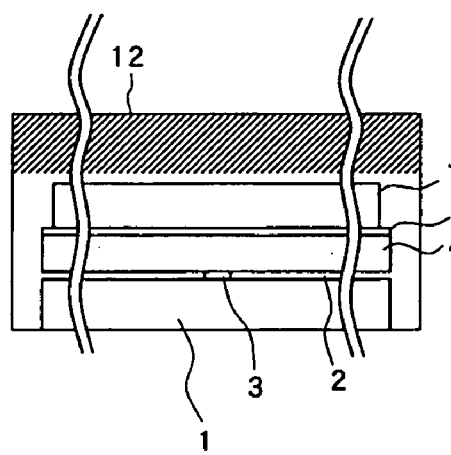 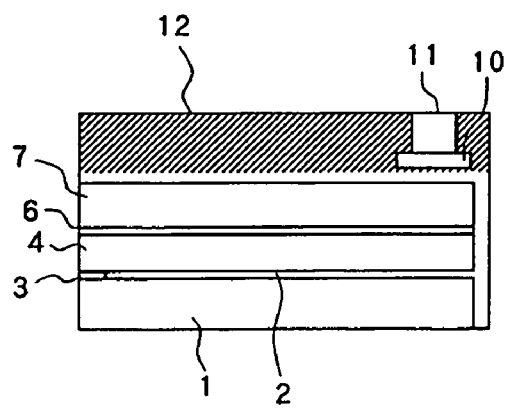
Air bearing surface
FIG.12C

Air bearing surface

FIG.14A   FIG.14B
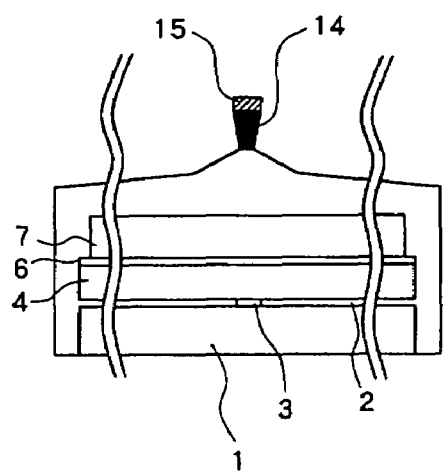
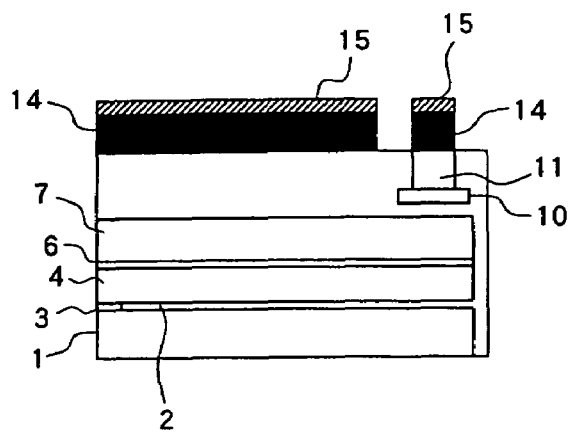
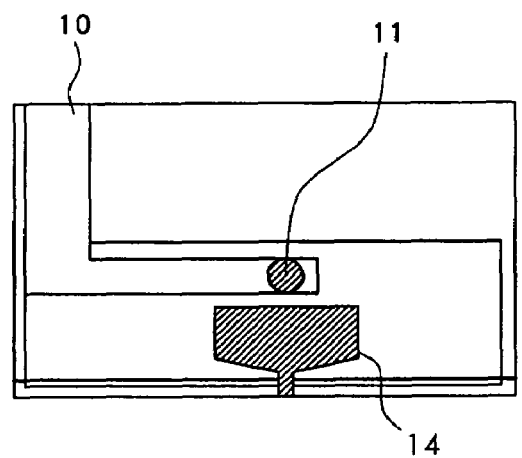
Air bearing surface
FIG.14C

FIG.15A FIG.15B

Air bearing surface

FIG.16A
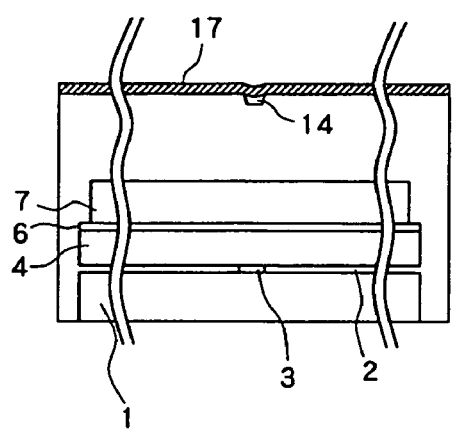
FIG.16B
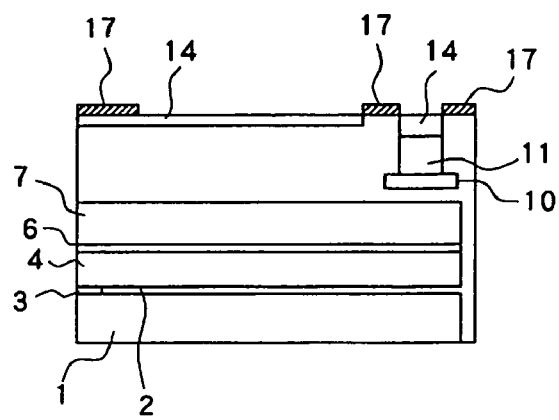
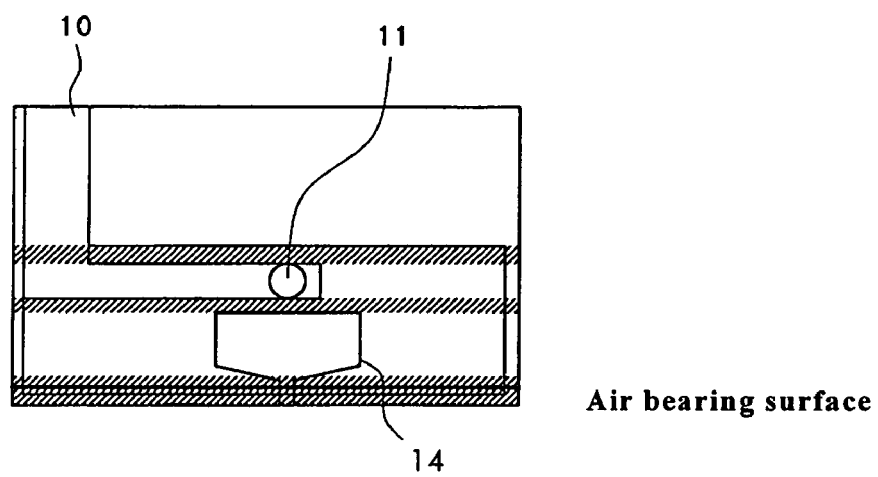
Air bearing surface
FIG.16C

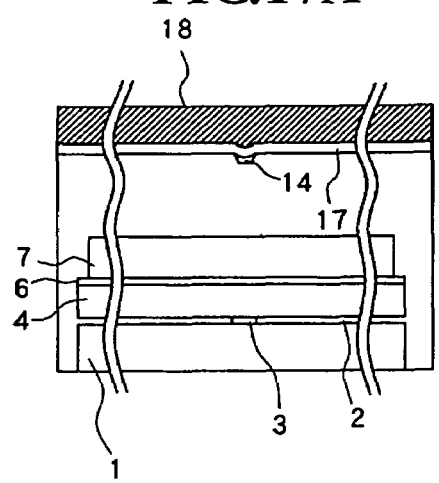
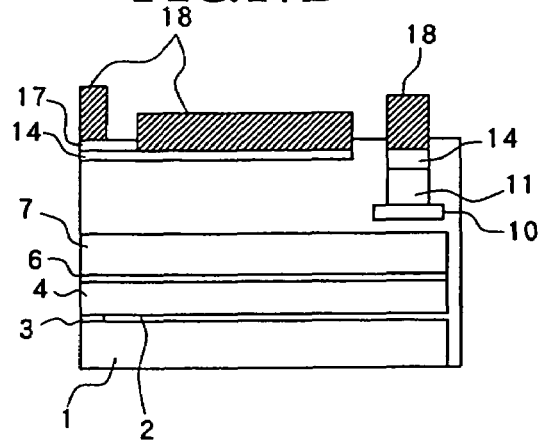
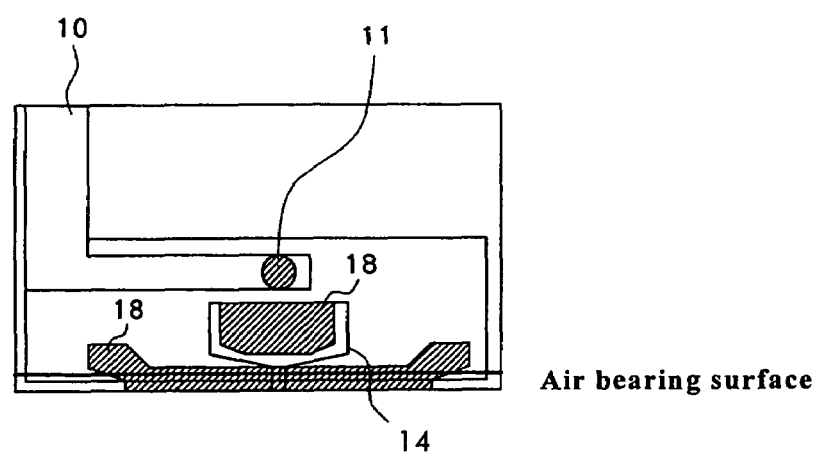
Air bearing surface
FIG.17C

Air bearing surface

Air bearing surface

FIG. 20A
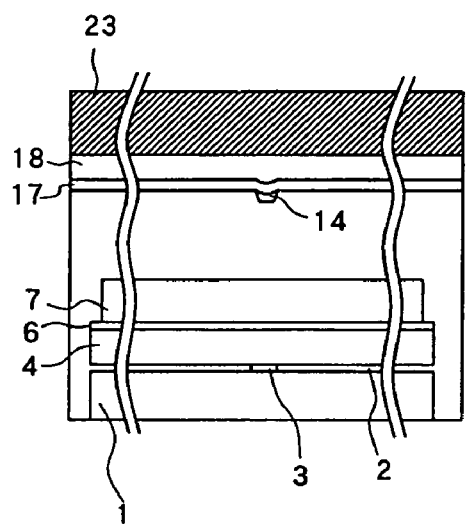
FIG. 20B
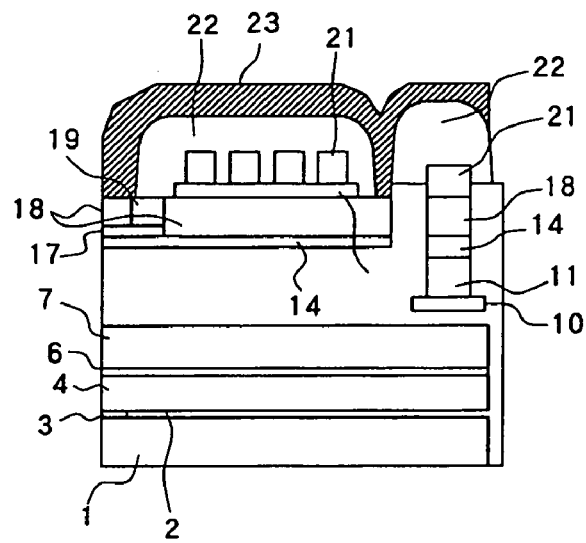
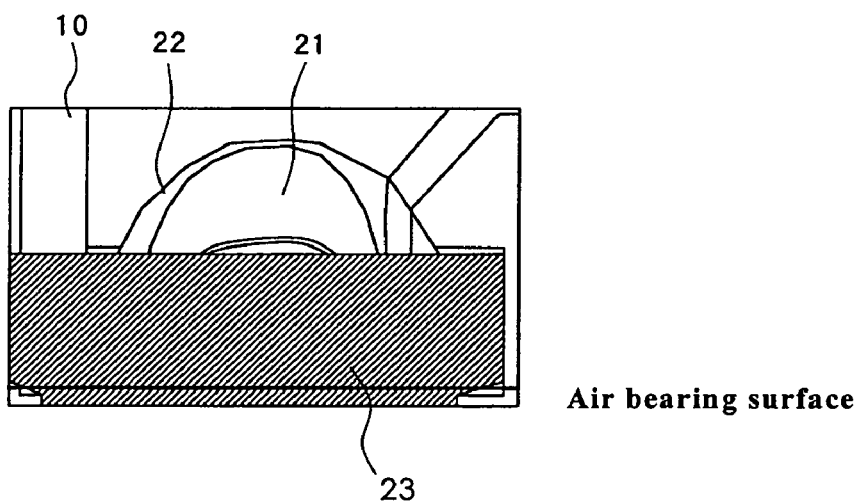
Air bearing surface
FIG. 20C

METHOD FOR MANUFACTURING A MAGNETIC HEAD USING A MULTI-STAGE ION MILLING

This Application is an U.S. Nonprovisional Utility Patent Application that claims priority from Japanese Patent Application No. 2004-323977 filed Nov. 8, 2004, the complete disclosure of which is incorporated herein by reference.

BACKGROUND OF THE INVENTION

1. Field of the Invention

The present invention relates to a method for manufacturing a magnetic head for perpendicular magnetic recording/reproducing.

2. Description of the Related Art

A perpendicular magnetic recording/reproducing process is less affected by thermal fluctuations even if the areal recording density is increased, as compared with an in-plane magnetic recording/reproducing process which has been conventionally used in wide applications. For this reason, the perpendicular magnetic recording/reproducing process is drawing attention in recent years as a technology which can satisfy the demand for an increased areal recording density in magnetic recording/reproducing apparatuses such as hard disk drives.

One problem of this perpendicular magnetic recording/reproducing process is that a magnetization pattern, which essentially should be recorded straight with respect to the track width direction (radial direction of the magnetic recording medium) of a magnetic recording medium, is recorded curved with respect to the track width direction. This problem will be described below in brief, although it is described in Japanese Patent Laid-open Publication No. 2002-279606 (hereinafter called Patent Document 1).

Perpendicular magnetic recording/reproducing apparatuses often employ a magnetic head in a monopole type. When a magnetic head in this type is employed, contour lines in the magnetic writing field generated from the main magnetic pole are distributed concentrically, with the maximum strength appearing at the center of the main magnetic pole.

When a magnetic head in a monopole type is employed, the magnetization pattern recorded on a magnetic recording medium mainly depends on the magnetic writing field on the trailing edge of the main magnetic pole, i.e., downstream side in a direction in which the magnetic recording medium is rotated. Since the contour lines in the magnetic writing field generated from the main magnetic pole are distributed concentrically with the maximum strength appearing at the center of the main magnetic pole, as mentioned above, the contours in the magnetic writing field are curved with respect to the track width direction on the trailing edge that is spaced from the center of the main magnetic pole. Accordingly, the magnetization pattern recorded on the magnetic recording medium is curved with respect to the track width direction.

This phenomenon of magnetization pattern curving with respect to the track width direction may cause a lot of undesirable results, such as limiting an increase in the linear recording density and the deterioration in the reproduced signals.

According to the invention described in Patent Document 1, the main magnetic pole has an arcuate recess on the trailing edge, in order to change and correct the contour lines in the magnetic writing field generated from the main magnetic pole.

In the paragraphs 0008 to 0010 in the above-mentioned Patent Document 1, a process is described for forming an arcuate recess in the main magnetic pole on the trailing edge, using ion milling, RIE (Reactive Ion Etching), and CMP (Chemical Mechanical Polishing) for that purpose.

However, no description is made regarding the steps and the conditions for ion milling, RIE, or CMP in Patent Document 1. A description is given in the paragraph 0009 that since the central portion of the main magnetic pole differs in composition and crystallinity from the other portion, and is less resistive to polishing, an arcuate recess can be naturally formed in the main magnetic pole on the trailing edge by polishing rather strongly by CMP. However, using such a process would make it considerably more difficult to enhance controllability and reproducibility of the arcuate recess as well as to enhance uniformity within a wafer.

SUMMARY OF THE INVENTION

It is an object of the present invention to provide a method for forming an arcuate recess in a main magnetic pole on a trailing edge, with high controllability and reproducibility thereof, as well as with uniformity within a wafer.

To achieve the above object, in the present invention, a non-magnetic film is deposited over and around the main magnetic pole which was patterned in advance, such that the main magnetic pole is embedded therein, and subsequently the non-magnetic film is polished and planarized until the main magnetic pole is exposed, wherein the non-magnetic film is made of a non-magnetic material which exhibits a lower ion milling rate than a magnetic metal material which constitutes the main magnetic pole. Next, a surface that is polished and planarized is etched, by means of ion milling, from a direction which forms a first angle relative to a stacked direction of the magnetic head, to form a stepped portion in which the main magnetic pole is lower from the non-magnetic film around the main magnetic pole. Next, the stepped portion is etched, by means of ion milling, from a direction which forms a second angle relative to the stacked direction, wherein the second angle is larger than the first angle. In this way, an arcuate recess is formed in the main magnetic pole on the trailing edge. The stacked direction is coincides with the direction in which a magnetic recording medium is rotated, so that the etched surface is oriented to the trailing edge of the main magnetic pole.

The first angle may range from 0 degree to 50 degrees. When the surface is etched by ion milling from a direction which forms this relatively small angle to the stacked direction, the stepped portion is efficiently formed because a large difference arises in the ion milling rate between the magnetic metal material which constitutes the main magnetic pole and the surrounding non-magnetic material.

Due to the existence of the stepped portion, when the stepped surface is etched at the predetermined angle, the probability that ion beams reach the surface from the center of the main magnetic pole layer to the boundary between the main magnetic pole layer and the non-magnetic film is gradually decreased. In other words, the ion milling rate is gradually decreased from the center of the main magnetic pole layer to the boundary between the main magnetic pole layer and the non-magnetic film. In this way, an arcuate recess is formed in the main magnetic pole layer on the trailing edge. The second angle is relatively large, and may be range from 55 degrees to 80 degrees. As the depth of the stepped portion and the angle of the ion milling is increased, the difference in the ion milling rate between the central portion of the main magnetic pole layer and the boundary portion adjacent to the non-magnetic film is increased, and therefore the arcuate recess is formed in a smaller radius of curvature.

The size or depth of the stepped portion depends on the difference in the ion milling rate between the magnetic metal material which constitutes the main magnetic pole layer and the non-magnetic material which constitutes the surrounding non-magnetic film, as well as on the angle and the processing time etc. of the ion milling. Accordingly, the radius of curvature of the arcuate recess of the main magnetic pole layer on the trailing edge can be controlled by appropriately controlling the size of the stepped portion as described above, as well as by appropriately controlling the angle and the processing time of the ion milling etc. This allows for a high level of controllability and reproducibility of the arcuate recess, and uniformity within a wafer.

The above and other objects, features and advantages of the present invention will become apparent from the following description with reference to the accompanying drawings which illustrate examples of the present invention.

BRIEF DESCRIPTION OF THE DRAWINGS

FIG. 7 is a flow chart illustrating the steps for manufacturing a magnetic head according to an embodiment of the present invention;

FIGS. 9A to 9C are diagrams illustrating the step for forming shield gap non-magnetic film 6 according to an embodiment of the present invention;

FIGS. 11A to 11C are diagrams illustrating the step for forming insulating film 9, coil lead 10, and coil terminal 11 according to an embodiment of the present invention;

FIGS. 12A to 12C are diagrams illustrating the step for forming and polishing insulating film 12 according to an embodiment of the present invention;

FIGS. 14A to 14C are diagrams illustrating the step for forming the main magnetic pole according to an embodiment of the present invention;

FIGS. 15A to 15C are diagrams illustrating the step for forming and polishing non-magnetic film 16, and forming an arcuate recess in main magnetic pole layer 14 according to an embodiment of the present invention;

FIGS. 16A to 16C are diagrams illustrating the step for forming non-magnetic film 17 according to an embodiment of the present invention;

FIGS. 17A to 17C are diagrams illustrating the step for forming upper write shield supporting layer 18 according to an embodiment of the present invention;

FIGS. 20A to 20C are diagrams illustrating the step for forming upper write shield layer 23 according to an embodiment of the present invention.

DETAILED DESCRIPTION OF THE INVENTION

A description will be given first of the structure of a magnetic head of an embodiment of the present invention. Next, a description will be given in detail of a method for forming a main magnetic pole according to an embodiment of the present invention. Finally, a description will be given of a method for manufacturing a magnetic head of an embodiment of the present invention including the formation of the main magnetic pole.

First, a description will be given of the structure of a magnetic head of an embodiment of the present invention. The magnetic head of an embodiment of the present invention is of a perpendicular magnetic recording/reproducing type which has a write shield (hereinafter referred to as an upper write shield layer) in the vicinity of the main magnetic pole. This type of magnetic head is called a perpendicular magnetic recording/reproducing magnetic head with a shielded pole design. According to such a shielded pole design, undesired magnetic flux that is radiated by the main magnetic pole is absorbed in the write shield which serves as a magnetic shield against the main magnetic pole. As a result, erroneous recording can be avoided, and the magnetic field is radiated by the main magnetic pole with a sharp gradient, resulting in increased linear recording density.

Figure 1A:
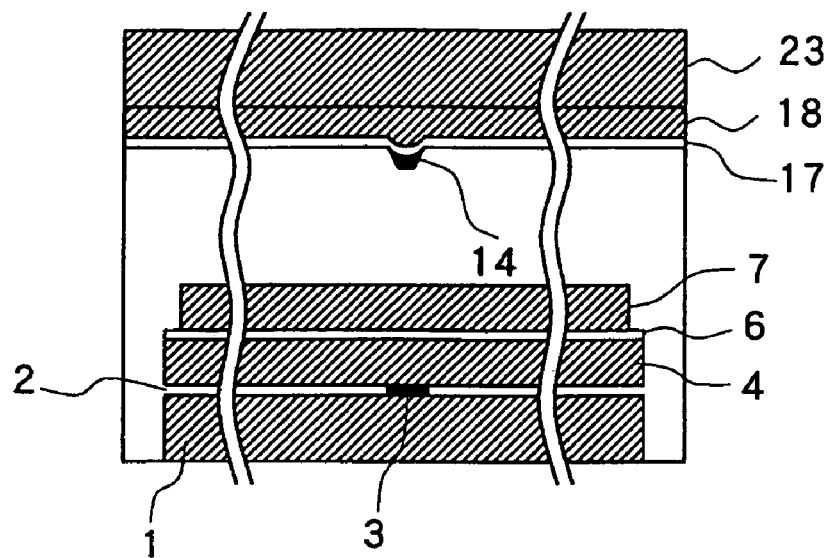
FIG. 1A is a view of a magnetic head of an embodiment of the present invention viewed from the air bearing surface.
Figure 1B:
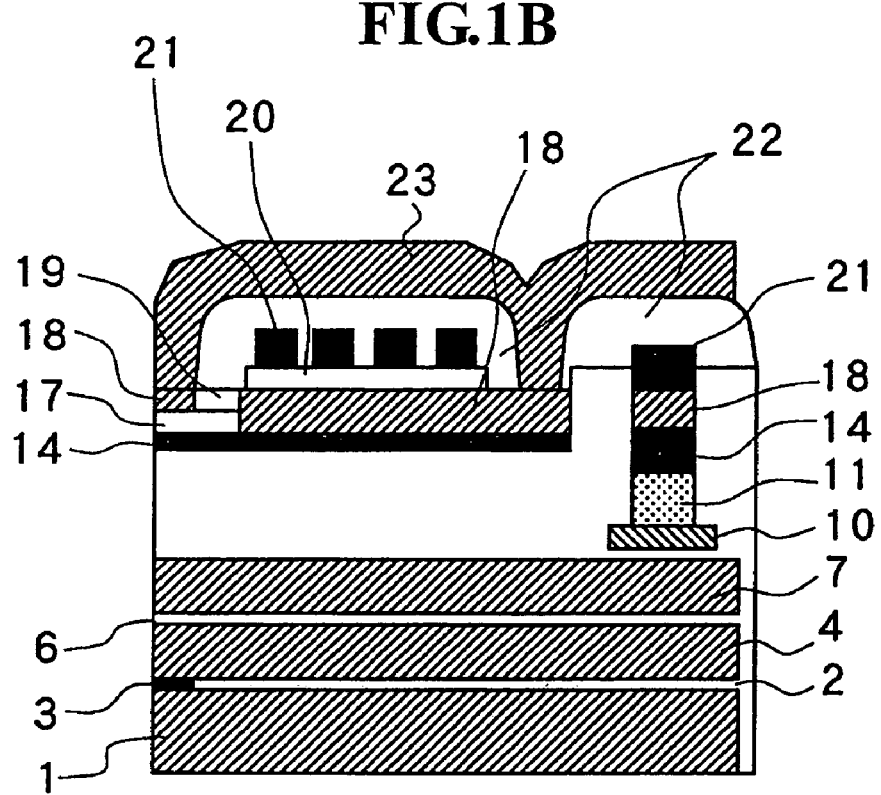
FIG. 1B is a sectional view of the magnetic head of FIG. 1A taken along a plane perpendicular to the air bearing surface and parallel with the stacked direction.

Referring to FIGS. 1A and 1B, the magnetic head roughly consists of a read head portion and a write head portion. The read head portion includes lower read shield layer 1, shield gap insulating film 2, MR (Magneto Resistive) element 3, and upper read shield layer 4. The write head portion includes lower write shield layer 7, coil lead 10, coil terminal 11, main magnetic pole layer 14, non-magnetic film 17, upper write shield supporting layer 18, non-magnetic layer 19, insulating film 20, coil 21, coil insulating film 22, and upper write shield layer 23. In these figures, blank areas correspond to insulating materials or non-magnetic materials. Each component will be described in detail in the order of the read head portion and the write head portion.

The read head portion reads magnetized signals recorded on a magnetic recording medium that is arranged opposite to the air bearing surface of the magnetic head.

MR element 3, which is a core element of the read head portion, detects the magnetized signals recorded on the magnetic recording medium, based on a change in electric resistance. As shown in FIG. 1B, MR element 3 is disposed on the air bearing surface. MR element 3 may be, for example, a giant magneto-resistance (GMR) element, or a tunnelling magneto-resistance (TMR) element.

Lower read shield layer 1 and upper read shield layer 4 may be made of soft magnetic materials such as perm-alloy. Lower read shield layer 1 and upper read shield layer 4 are formed to sandwich MR element 3 therebetween, thereby reducing the influence, which is induced by the magnetized signals in adjacent bits on the magnetic recording medium, on the function of MR element 3 to read the magnetized signals.

Shield gap insulating film 2, which may be made of an insulating material such as $Al_2O_3$, ensures electrical insulation between MR element 3 and metallic lower read shield layer 1, and between MR element 3 and metallic upper read shield layer 4.

Shield gap non-magnetic film 6, which may be made of a non-magnetic material such as $Al_2O_3$ or Ru, mitigates the magnetic correlation between upper read shield layer 4 in the read head portion and lower read shield layer 7 in the write head portion.

The write head portion radiates magnetic flux to the magnetic recording medium that is arranged opposite to the air bearing surface of the magnetic head in order to record magnetized signals.

Lower write shield layer 7 may be made of a soft magnetic material such as perm-alloy. Lower write shield layer 7 functions as an auxiliary magnetic pole for main magnetic pole layer 14, and magnetic flux that is radiated by main magnetic pole layer 14 to the magnetic recording medium is absorbed by lower write shield layer 7 after it returns toward the magnetic head from the magnetic recording medium.

Coil lead 10, which may be made of a metal such as Cu, serves as a wire to conduct electrical current into coil 21 from the outside.

Coil terminal 11 may be made of a metal such as Cu. Coil 21 is formed such that it is wound around upper write shield layer 23 starting from the location of coil terminal 11.

Main magnetic pole layer 14 may be made of a magnetic metal material, such as iron-cobalt alloy, and has a high saturation magnetic flux density. Main magnetic pole layer 14 radiates magnetic flux, which is generated by the electrical current applied to coil 21, to the magnetic recording medium. Main magnetic pole layer 14 becomes narrower in width near the air bearing surface, and by properly controlling the position of a flare point (FP) and the length of a neck height (NH), the magnetic flux is efficiently radiated to the magnetic recording medium. The FP means a point at which the width of the main magnetic pole begins to increase in a direction perpendicular to the air bearing surface. The NH means the distance from the air bearing surface to the FP.

Main magnetic pole layer 14 is, at the air bearing surface, formed in an inverted trapezoid shape which has a longer side on the trailing edge (downstream side in the direction in which the magnetic recording medium is rotated) and a shorter side on the leading side (upstream side in the direction in which the magnetic recording medium is rotated). Such a configuration serves to prevent side erase that is caused by skew effect. See, for example, Japanese Patent Laid-open Publication No. 2003-263705. The skew effect means that the main magnetic pole of the magnetic head is inclined with regard to the direction in which the magnetic recording medium is rotated. This phenomenon occurs when the magnetic head is moved in a radial direction (track width direction) of the magnetic recording medium, and depends on the location of the magnetic recording medium. The side erase means the erasure of data on the tracks adjacent to a track on which data are being recorded. Since the main magnetic pole is formed in an inverted trapezoid shape at the air bearing surface, the main magnetic pole is not oriented toward the adjacent track even if it is inclined due to the skew effect, and the side erase can be prevented.

In order to form main magnetic pole layer 14 in an inverted trapezoid shape at the air bearing surface, an overlying layer is formed on main magnetic pole layer 14. This overlying layer is made of a material which exhibits a lower the ion milling rate (higher milling resistance), such as $Al_2O_3$, than the magnetic metal material, such as iron-cobalt alloy, which forms main magnetic pole layer 14. The overlying layer lowers the ion milling rate of the upper portion of main magnetic pole layer 14 which is formed below the overlying layer. Due to the difference in the ion milling rate between the lower and the upper portion of main magnetic pole layer 14 that is caused by the overlying layer, main magnetic layer 14 is formed in an inverted trapezoid shape at the air bearing surface. See, for example, Japanese Patent Laid-open Publication No. 2003-203311.

Main magnetic pole layer 14 has an arcuate recess on the trailing edge. As will be described later, this configuration is obtained due to the difference in the ion milling rate during etching between the magnetic metal material which forms main magnetic pole layer 14 and a non-magnetic material, such as $Al_2O_3$ or AlN, which forms a non-magnetic film and embeds main magnetic pole layer 14 therein. Due to the configuration of main magnetic pole layer 14 that has an arcuate recess on the trailing edge, the contour lines in the magnetic writing field of the main magnetic pole on the trailing edge, which controls the shape of the magnetization pattern on the magnetic recording medium as described in "Description of the Related Art," are corrected so that they become straight lines with respect to the track width direction.

Non-magnetic film 17, which may be made of a non-magnetic material such as $Al_2O_3$ or Ru, magnetically separates main magnetic pole layer 14 and upper write shield supporting layer 18 near the air bearing surface, and forms a write gap. Non-magnetic film 17 is preferably 200 nm or less in thickness. Because of this thickness and the shielding effect of the upper write shield against main magnetic pole layer 14, which will be described later, erroneous recording due to the undesired magnetic flux that is radiated by main magnetic pole layer 14 can be avoided, and the magnetic field is radiated by the main magnetic pole with a sharp gradient.

Upper write shield supporting layer 18 may be made of a soft magnetic material such as perm-alloy. Upper write shield supporting layer 18 supports upper write shield layer 23, and constitutes, together with upper write shield layer 23, an upper write shield which functions as a magnetic shield and as an auxiliary magnetic pole of the main magnetic pole. As non-magnetic film 17 is 200 nm or less in thickness as described above, the upper write shield prevents erroneous recording due to undesired magnetic flux radiated by the main magnetic pole, and causes the magnetic field to be radiated by the main magnetic pole with a sharp gradient, due to the magnetic shielding effect against the main magnetic pole. The upper write shield, as well as lower write shield layer 7, has a function as an auxiliary magnetic pole of main magnetic pole layer 14, i.e., a function of absorbing magnetic flux that is radiated by main magnetic pole layer 14 to the magnetic recording medium after it returns from the magnetic recording medium to the magnetic head.

Further, as non-magnetic film 17 is formed as thin as 200 nm or less, the shape of the arcuate recess of main magnetic pole layer 14 on the trailing edge is reproduced in non-magnetic film 17 that is deposited thereon by sputtering etc. Therefore, when upper write shield supporting layer 18 is deposited on non-magnetic layer 17 by plating etc., an arcuate protrusion that conforms to the arcuate recess of main magnetic pole layer 14 on the trailing edge is naturally formed in upper write shield supporting layer 18 on the side of non-magnetic film 17.

As described in Japanese Patent Laid-open Publication No. 2002-92820, this protrusion serves to prevent scattering of magnetic flux radiated by the main magnetic pole in the track width direction, and thereby serves to increase the strength of magnetic field in the central portion. This function of the protrusion is particularly important for a magnetic head which employs the shielded pole design. Specifically, although the magnetic head that employs the shielded pole design has the advantage that the magnetic field is radiated by the main magnetic pole with a sharp gradient due to the magnetic shielding effect of the upper write shield, it has the demerit that the intensity of the magnetic field radiated by the main magnetic pole is weakened. However, this demerit can be overcome by the function of this protrusion. It should be noted that the magnetic head disclosed in Japanese Patent Laid-open Publication No. 2002-92820 does not employ the shielded pole design.

Insulating film 20, which may be made of an insulating material such as $Al_2O_3$, electrically insulates coil 21 from upper write shield supporting layer 18.

Coil 21 may be made of a metal such as Cu. Coil 21 is formed such that it is wound around upper write shield layer 23 starting from the location of coil terminal 11. Electric current is applied to coil 21 from the outside through coil lead 10 to generate magnetic flux, which is radiated by main magnetic pole layer 14 toward the magnetic recording medium. Although more than one material is deposited on coil terminal 11, insulating materials are not deposited between coil terminal 11 and coil 21 in order to ensure an electric connection between coil lead 10 and coil 21.

Coil insulating film 22, which may be made of an insulating material, such as a photo-resist, ensures that there is an electric insulation between the turns of the coil.

Upper write shield layer 23 may be made of a soft magnetic material such as perm-alloy. Upper write shield layer 23 is supported by upper write shield supporting layer 18, and constitutes, together with upper write shield supporting layer 18, the upper write shield which functions as an auxiliary magnetic pole. Main magnetic layer 14 is magnetically connected to the upper write shield and conducts the magnetic flux, which is generated by the electrical current applied to coil 21 that is wound around the upper write shield and which is irradiated from main magnetic pole layer 14. The upper write shield, in addition to functioning as the magnetic shield and the auxiliary magnetic pole of the main magnetic pole, serves to correct the contour lines in the magnetic writing field of the main magnetic pole on the trailing edge, on which the magnetization pattern on the magnetic recording medium depends, so that they become straight lines with respect to the track width direction. Consequently, the shielded pole design, in conjunction with the arcuate recess in the main magnetic pole formed on the trailing edge, even more effectively corrects the contour lines in the magnetic writing field of the main magnetic pole on the trailing edge so that they become straight lines with respect to the track width direction.

Non-magnetic film 17, upper write shield supporting layer 18, and upper write shield layer 23 are essential elements for the shielded pole design.

The magnetic head as described above is incorporated into a slider, which is then assembled into a head gimbal assembly (a combination of the slider and a suspension), which is then assembled into a head arm assembly (a combination of the head gimbal assembly and an arm), which is further assembled into a head stack assembly (a combination of several head arm assemblies and a coil of a voice coil motor attached thereto). A head stack assembly is used in magnetic recording/reproducing apparatuses such as hard disk drives.

Figure 2:
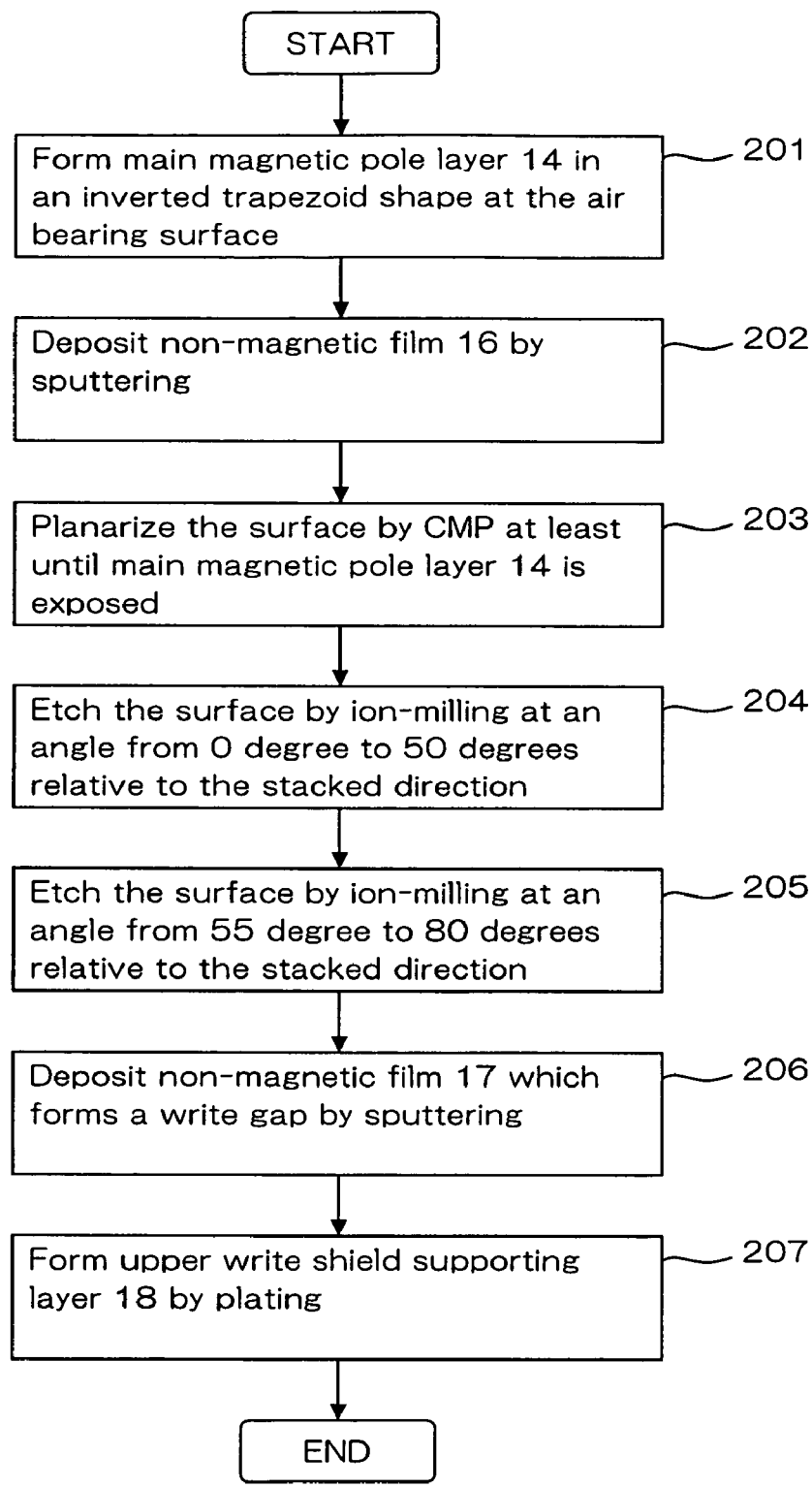
FIG. 2 is a flow chart illustrating the steps for forming a main magnetic pole according to an embodiment of the present invention.
Figure 3:
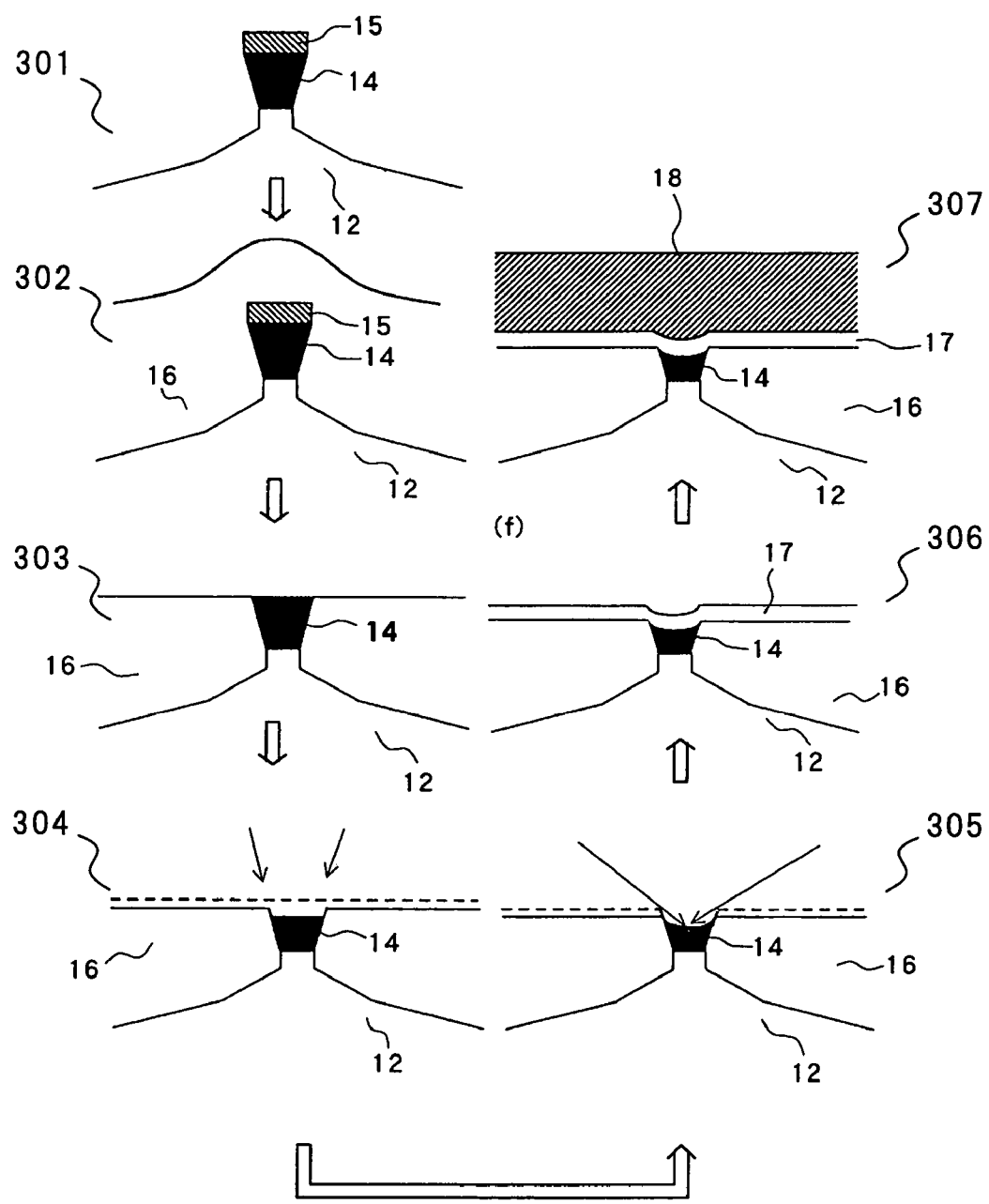
FIG. 3 is a schematic diagram illustrating the steps for forming a main magnetic pole according to an embodiment of the present invention.

Next, referring to FIGS. 2 and 3, a detailed description will be given of a method for forming the main magnetic pole of an embodiment of the present invention. The description will be focused on the steps after main magnetic pole layer 14 is formed in an inverted trapezoid shape at the air bearing surface, and until upper write shield supporting layer 18 is formed by plating. Steps 201 to 207 in FIG. 2 correspond to steps 301 to 307 in FIG. 3, respectively.

First, at step 201, main magnetic pole layer 14 is formed in an inverted trapezoid shape at the air bearing surface. Specifically, overlying layer 15 is formed on main magnetic layer 14. Overlying layer 15 is made of a material, such as $Al_2O_3$, which exhibits a lower the ion milling rate than the magnetic metal material which constitutes main magnetic pole layer 14. The main magnetic pole is patterned, using overlying layer 15 itself or a film additionally formed on overlying layer 15, as a mask for forming the main magnetic pole. The stacked structure consisting of main magnetic pole layer 14 and overlying layer 15 is etched by ion-milling from a direction that forms a predetermined angle relative to the stacked direction. The upper portion of main magnetic pole layer 14 is etched at a rate lower than the other portion due to the existence of overlying layer 15. In other words, main magnetic pole layer 14 is etched by ion-milling from a predetermined direction such that the ion milling rates differ between the upper portion and lower portion of main magnetic pole layer 14. In this way, an inverted trapezoid shape is formed at the air bearing surface. Step 301 in FIG. 3 schematically illustrates the condition after main magnetic pole layer 14 is formed in an inverted trapezoid shape at the air bearing surface.

Next, at step 202, non-magnetic film 16, made of a non-magnetic material, such as $Al_2O_3$ or AlN, which exhibits an ion milling rate lower than the magnetic metal material which constitutes main magnetic pole layer 14, is uniformly deposited by sputtering such that main magnetic pole layer 14 is embedded therein. Step 302 in FIG. 3 schematically illustrates the condition after non-magnetic film 16 is deposited.

Next, at step 203, the surface on which non-magnetic film 16 has been deposited is planarized by CMP at least until main magnetic pole layer 14 is exposed. Step 303 in FIG. 3 schematically illustrates the condition after the surface is planarized by CMP.

Next, at step 204, the surface planarized by CMP is etched by ion-milling from a direction that forms a predetermined angle, for example from 0 degree to 50 degrees, relative to the stacked direction. At such an angle, a larger difference in the ion milling rate arises between the magnetic metal material which constitutes main magnetic pole layer 14 and the non-magnetic material which constitutes non-magnetic film 16. More etching is performed in main magnetic pole layer 14 than in surrounding non-magnetic film 16, and a stepped portion is formed in which main magnetic pole layer 14 is lower than surrounding non-magnetic film 16. Step 304 in FIG. 3 schematically illustrates the condition after such a stepped portion is formed. The dotted line shows the surface which was planarized by CMP at step 203.

Next, at step 205, the stepped surface is etched by ion-milling from a direction that forms a predetermined angle, for example from 55 degrees to 80 degrees, relative to the stacked direction. Due to the existence of the stepped portion formed at step 204, when the stepped surface is etched at the predetermined angle, the probability that ion beams reach the surface is decreased gradually from the center of main magnetic pole layer 14 to the boundary between main magnetic pole layer 14 and non-magnetic film 16. In other words, the ion milling rate is decreased gradually from the center of main magnetic pole layer 14 to the boundary between main magnetic pole layer 14 and non-magnetic film 16. In this way, an arcuate recess is formed in main magnetic pole layer 14 on the trailing edge. Step 305 in FIG. 3 schematically illustrates the condition after an arcuate recess is formed in main magnetic pole layer 14 on the trailing edge. The dotted line shows the stepped surface formed at step 204.

As the depth of the stepped portion and the angle of the ion milling at step 205 is increased, the difference in the ion milling rate between the central portion of main magnetic pole layer 14 and the boundary portion adjacent to non-magnetic film 16 is increased, and therefore the arcuate recess is formed in a smaller radius of curvature. The size or depth of the stepped portion depends on the difference in the ion milling rate between the magnetic metal material which constitutes main magnetic pole layer 14 and the non-magnetic material which constitutes surrounding non-magnetic film 16, as well as on the angle and the processing time etc. of ion milling at step 204. Accordingly, the radius of curvature of the arcuate recess of main magnetic pole layer 14 on the trailing edge can be controlled by appropriately controlling the size of the stepped portion as described above, as well as by appropriately controlling the angle and the processing time of ion milling etc. at step 205. This allows for a high level of controllability and reproducibility of the arcuate recess, and uniformity within a wafer.

At step 206, non-magnetic film 17 which forms the write gap is deposited by sputtering on main magnetic pole layer 14 in which the arcuate recess is formed on the trailing edge, and on the surrounding non-magnetic film 16. The thickness of non-magnetic film 17 preferably may be 200 nm or less in order to ensure, for example, that there will be an effect that the magnetic field is radiated by the main magnetic pole with a sharp gradient which results from the magnetic shielding of the upper write shield that is formed on non-magnetic film 17. In addition, as non-magnetic film 17 is formed in this thickness, the arcuate recess of main magnetic pole layer 14 on the trailing edge is reproduced in non-magnetic film 17. Step 306 in FIG. 3 schematically illustrates the condition after non-magnetic film 17 is deposited.

Finally, at step 207, upper write shield supporting layer 18 which forms part of the upper write shield is formed on non-magnetic film 17 by plating. As non-magnetic film 17 is formed in a thickness of 200 nm or less, occurrence of the effect that the magnetic field is radiated by the main magnetic pole with a sharp gradient, which arises from the magnetic shielding of the upper write shield, can be ensured. Further, since the arcuate recess of main magnetic pole layer 14 on the trailing edge is reproduced in non-magnetic film 17, an arcuate protrusion, which conforms to the arcuate recess of main magnetic pole layer 14 on the trailing edge, is formed in upper write shield layer 18 on the side of non-magnetic film 17 (the write gap). Step 307 in FIG. 3 schematically illustrates the condition after upper write shield supporting layer 18 is formed.

Due to the protrusion that is formed in the upper write shield on the side of non-magnetic film 17 (the write gap) in the foregoing manner, the following effects are expected. Specifically, when magnetic flux radiated by the main magnetic pole is absorbed in the write shield, the magnetic flux is concentrated on the protrusion. As a result, the strength of magnetic field is increased in the central portion, and scattering of magnetic flux in the track width direction is prevented. In this way, broadening the writing area of the magnetic writing field outside the track edges can be suppressed, and a sharp track edge can be easily formed. This allows for narrower tracks and improvement of track density.

A technique of forming a protrusion in an auxiliary magnetic pole on the side of the main magnetic pole in order to suppress scattering of magnetic flux radiated by the main magnetic pole in the track width direction has already been disclosed in Japanese Patent Laid-open Publication No. 2002-92820. Although the steps for forming the protrusion in the auxiliary magnetic pole are not described in this patent document, judging from the entire specification, additional steps seem to be required to form the protrusion. On the other hand, the present embodiment employs the shielded pole design with an arcuate recess formed in the main magnetic pole layer 14 on the trailing edge. Accordingly, the protrusion can be formed only by sequentially forming non-magnetic film 17 which constitutes the write gap, and upper write shield supporting layer 18 which constitutes part of the upper write shield.

Although a magnetic head which employs the shielded pole design has the advantage, for example, that magnetic field is radiated by the main magnetic pole with a sharp gradient, it has the disadvantage that the strength of the magnetic field radiated by the main magnetic pole is weakened. This disadvantage can be overcome by increasing the strength of magnetic field in the central portion by forming the protrusion. In a magnetic head which does not employ the shielded pole design as described in Japanese Patent Laid-open Publication No. 2002-92820, the protrusion mainly serves to prevent scattering of magnetic flux radiated by the main magnetic pole in the track width direction. In this type of magnetic head, the return path magnetic pole does not work to provide magnetic shielding effect against the main magnetic pole, because the return path magnetic pole on the trailing edge of the main magnetic pole is located far from the main magnetic pole. On the other hand, in a magnetic head which employs the shielded pole design, as in the present embodiment, the protrusion serves not only to prevent scattering of magnetic flux radiated by the main magnetic pole in the track width direction, but also serves to recover the strength of magnetic field which is weakened due to the shielded pole design. From this view of point, it can be said that the protrusion needs to be provided in the shielded pole design, and for that purpose, the arcuate recess needs to be formed in the main magnetic pole on the trailing edge.

In summary, the shielded pole design with the arcuate recess formed in the main magnetic pole on the trailing edge serves not only to correct the contour lines in the magnetic writing field on the trailing edge of the main pole so that they become straight lines with respect to the track width direction, but also serves to prevent scattering of the magnetic writing field in the track width direction, and additionally serves to recover the strength of magnetic writing field which is weakened due to the shielded pole design. Further, the upper write shield in the shielded pole design has an additional function of correcting the contour lines in the magnetic writing field of the main magnetic pole on the trailing edge so that they become straight lines with respect to the track width direction. Therefore, this effect according to which the contour lines in the magnetic writing field of the main magnetic pole on the trailing edge is corrected so that they become straight lines with respect to the track width direction due to the recess formed in the main magnetic pole on the trailing edge, can be further improved by the upper write shield.

Figure 4:
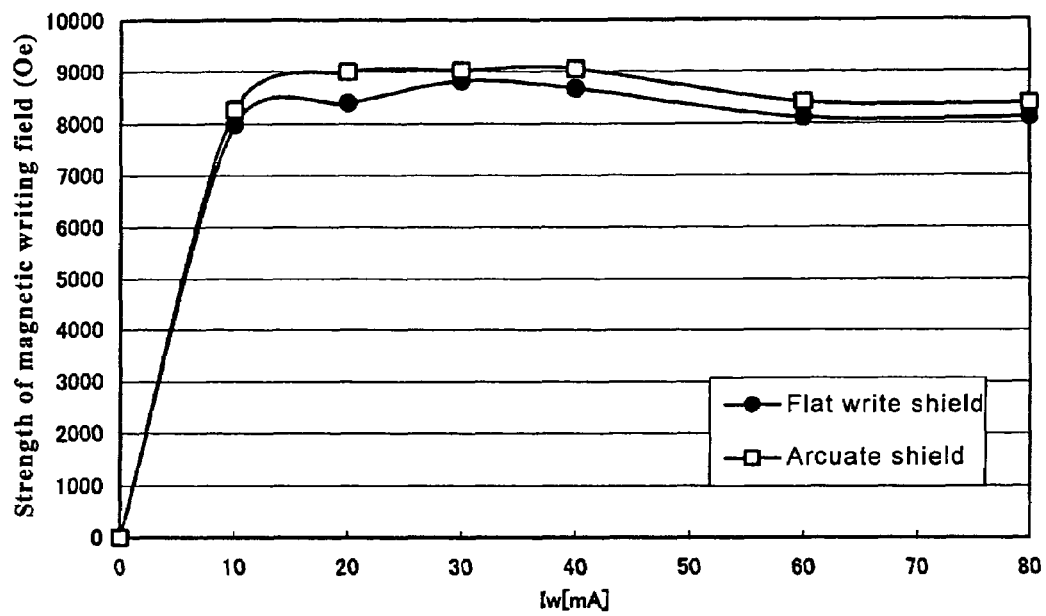
FIG. 4 is a graph showing the strength of magnetic writing field versus the electrical current applied to the coil, for a magnetic head of an embodiment of the present invention (a magnetic head with shielded pole design in which the main magnetic pole has an arcuate recess on the trailing edge and the upper write shield has a protrusion on the write gap side), and for a magnetic head with shielded pole design in which the main magnetic pole is formed flush on the trailing edge, and the upper write shield is also formed flush on the write gap side.

Referring to FIG. 4, the strength of magnetic writing field versus the electrical current applied to the coil is shown in a graph for two types of magnetic head. One is a magnetic head of the present embodiment that employs the shielded pole design with an arcuate recess formed in the main magnetic pole on the trailing edge, and that has a protrusion formed in the upper write shield on the write gap side. The other is a magnetic head which employs the shielded pole design having both the main magnetic pole on the trailing edge and the upper write shield on the write gap side formed flush. The data represents the strength of magnetic writing field, calculated by finite element method, at the center in the track width direction and at the center of the write gap thickness of 50 nm. A stronger magnetic writing field was observed over the entire range of electrical current for the magnetic head of the present embodiment, as compared with the magnetic head that has both the main magnetic pole on the trailing edge and the upper write shield on the write gap side formed flush.

Figure 5:
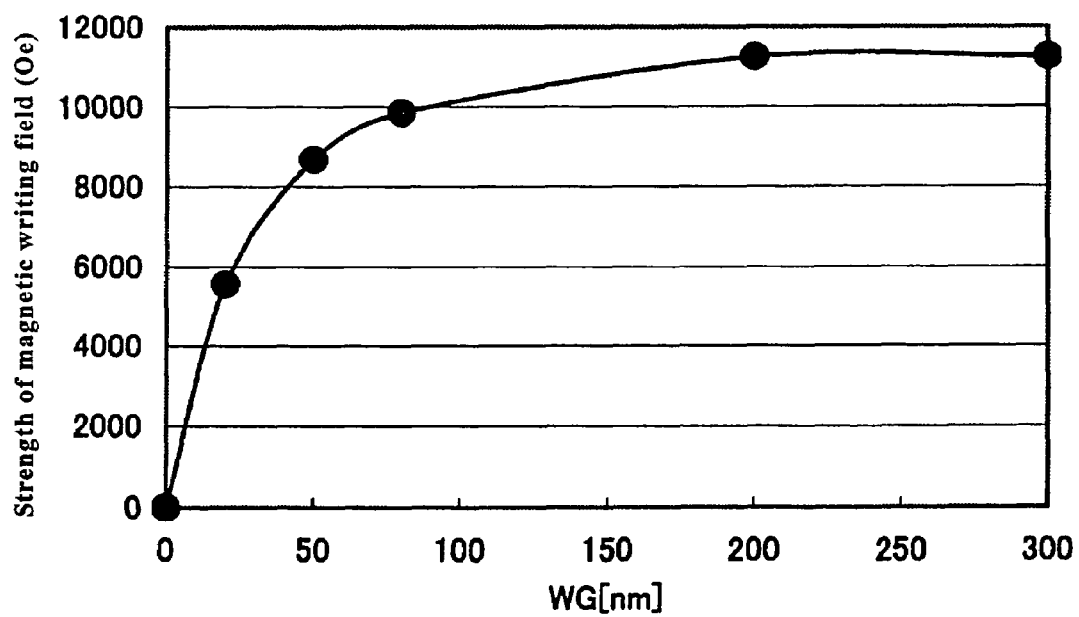
FIG. 5 is a graph showing the strength of magnetic writing field versus the thickness of the write gap, for a magnetic head with shielded pole design in which the main magnetic pole is formed flush on the trailing edge, and the upper write shield is also formed flush on the write gap side.
Figure 6:
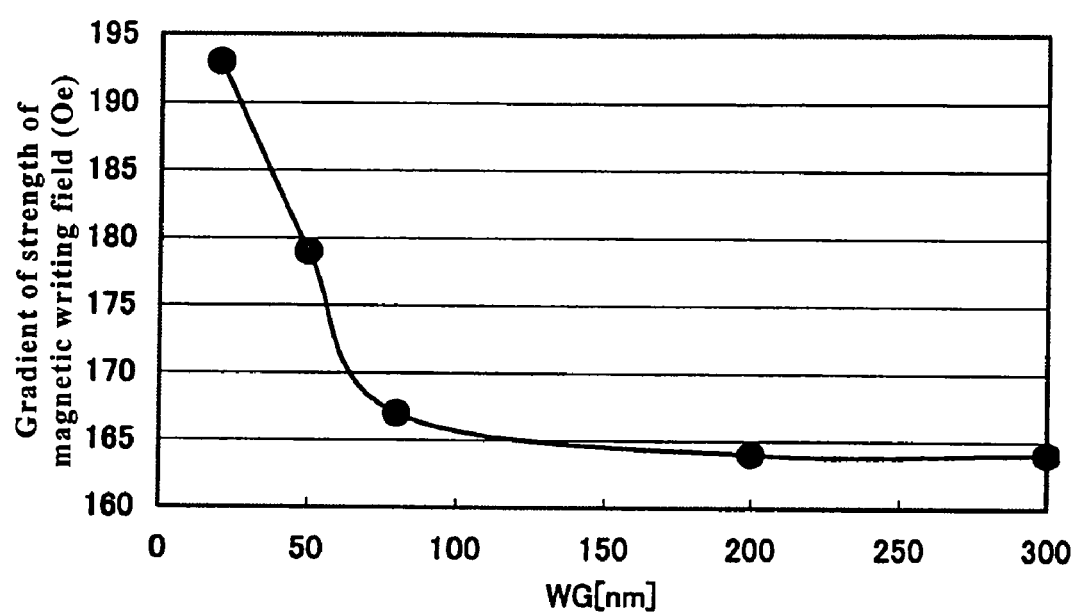
FIG. 6 is a graph showing the gradient of the magnetic writing field versus the thickness of the write gap for the magnetic head of FIG. 5.

FIGS. 5 and 6 respectively show the strength and the gradient of the magnetic writing field is shown respectively, for a magnetic head which employs the shielded pole design having both the main magnetic pole on the trailing edge and the upper write shield on the write gap side formed flush. The data represent the strength and the gradient of the magnetic writing field, calculated by finite element method, at the center in the track width direction and at the center of the write gap thickness when an electrical current of 40 mA is applied to the coil. As the write gap is decreased in thickness, the magnetic shielding effect by the upper write shield becomes stronger, the strength of magnetic writing field becomes smaller, and the gradient of the magnetic writing field becomes larger. The strength and the gradient of the magnetic writing field tend to be saturated when the write gap (non-magnetic film 17) thickness range is over 200 nm. Therefore, it is preferable to form the write gap in a thickness of 200 nm or less in order to ensure that the magnetic shielding effect due to the upper write shield will occur. In order to recover the strength of magnetic writing field which is weakened when the range of the write gap thickness is less than 200 nm, it is preferable to form a protrusion in the upper write shield on the write gap side, and to form an arcuate recess in the main magnetic pole on the trailing edge, based on the shielded pole design. By employing such a structure, the strength of magnetic writing field, which is weakened due to the shielded pole design, is increased and recovered as can be seen in FIG. 4.

Finally, referring to the flow chart in FIG. 7 and the diagrams in FIGS. 8A to 20C, a description will be given of the method for manufacturing a magnetic head of an embodiment of the present invention, including the formation of the main magnetic pole. In FIGS. 8A to 20C, the figures with suffix 'A' show views as seen from the air bearing surface, the figures with suffix 'B' show sectional views along a plane perpendicular to the air bearing surface and parallel with the stacked direction, and the figures with suffix 'C' show top plan views.

Figure 8A:
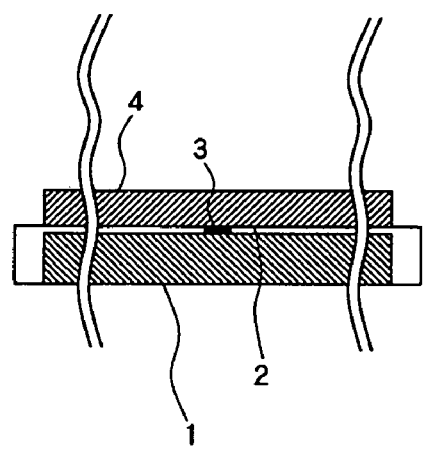
FIGS. 8A to 8C are diagrams illustrating the step for forming upper lead shield layer 4 according to an embodiment of the present invention.
Figure 8B:
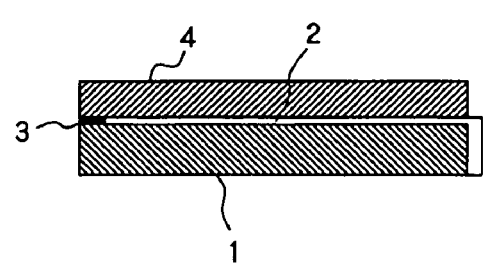
Figure 8C:
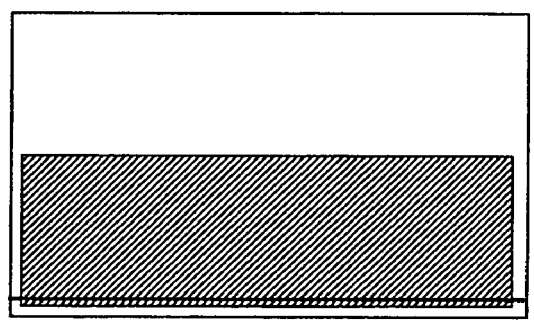

First, at step 701, the read head portion (lower read shield layer 1, shield gap insulating film 2, MR element 3, and upper read shield layer 4) is formed, as shown in FIGS. 8A to 8C, and steps to manufacture the write head portion are ready for operation. Next, at step 702, lower write shield layer 7 is formed, as shown in FIGS. 9A to 10C. Next, at step 703, coil lead 10 and coil terminal 11 are formed, as shown in FIGS. 11A to 11C. Next, at step 704, the main magnetic pole is formed, as shown in FIGS. 12A to 15C. Next, at step 705, upper write shield supporting layer 18 is formed, as shown in FIGS. 16A to 17C. Next, at step 706, coil 21 is formed, as shown in FIGS. 18A to 19C. Finally, at step 707, upper write shield layer 23 is formed to complete the write head portion, as shown in FIGS. 20 A to 20C.

The steps for forming the main magnetic pole of the present invention described with reference to FIGS. 2 and 3 correspond to steps 704 and 705 in FIG. 7. Each step will be described with reference to the respective drawings.

(Step 701: Formation of the read head portion) As shown in FIGS. 8A to 8C, after lower read shield layer 1, shield gap insulating film 2, and MR element 3 are formed on an insulating layer (not shown) that is deposited on a substrate (not shown), upper read shield layer 4 made of a material such as perm-alloy is formed by plating on shield gap insulating film 2. The read head portion is completed.

Figures 10A, 10B:
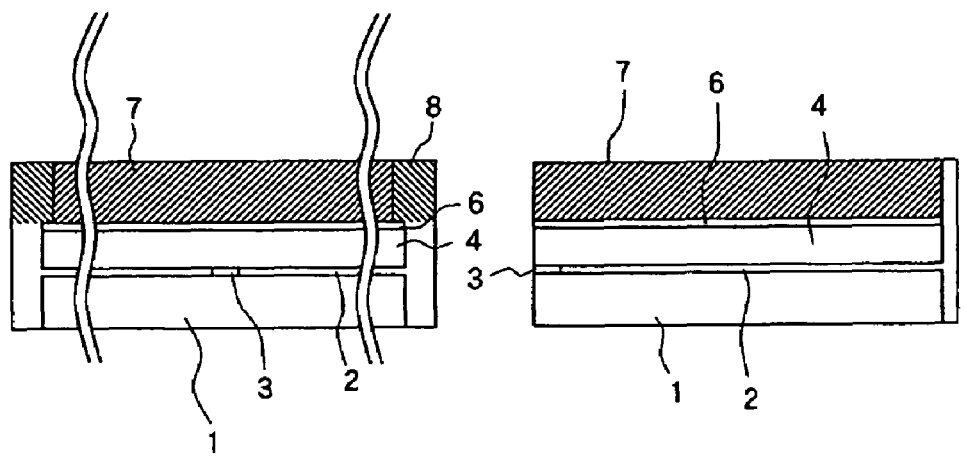
FIGS. 10A to 10C are diagrams illustrating the step for forming lower write shield layer 7 and non-magnetic film 8, and polishing non-magnetic film 8 according to an embodiment of the present invention.
Figure 10C:
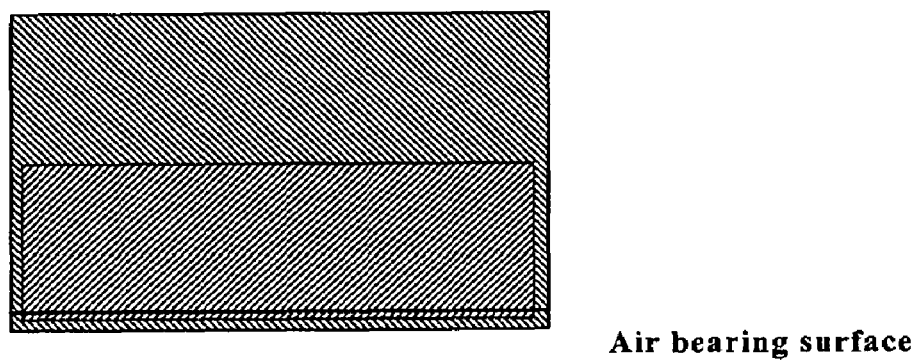

(Step 702: Formation of the lower write shield layer) As shown in FIGS. 9A to 9C, shield gap non-magnetic film 6 made of a material such as $Al_2O_3$, or Ru, which mitigates the magnetic correlation between upper read shield layer 4 (read head portion) and lower write shield layer 7 (write head portion), is formed by sputtering on upper read shield layer 4 that is formed by plating in FIGS. 8A to 8C. As shown in FIGS. 10A to 10C, lower write shield layer 7 made of a material such as perm-alloy is formed by plating on shield gap non-magnetic film 6 that is formed by sputtering in FIGS. 9A to 9C. Then, non-magnetic film 8 made of a material such as $Al_2O_3$ is uniformly formed by sputtering over the entire wafer, and subsequently polished by CMP, in order to planarize the plated surface of lower write shield layer 7. The surface is polished at least until lower write shield layer 7 is exposed.

(Step 703: Formation of the coil lead and the terminal) As shown in FIGS. 11A to 11C, insulating film 9 made of a material such as $Al_2O_3$, which electrically insulates lower write shield layer 7, is uniformly formed by sputtering on the surface planarized in FIGS. 10A to 10C over the entire wafer. Then, coil lead 10 made of a material such as Cu is formed by sputtering on insulating film 9, such that coil lead 10 is formed in an L-shaped pattern beginning at the upper left location of the magnetic head and ending at the location from which the coil is to be wound, as shown in FIG. 11C. Then, at the location from which the coil is to be wound, coil terminal 11 made of a material such as Cu is formed by plating on coil lead 10 so that coil terminal 11 is electrically connected to coil lead 10.

(Step 704: Formation of the main magnetic pole) As shown in FIGS. 12A to 12C, insulating film 12 made of a material such as $Al_2O_3$ is formed by sputtering, and then the surface is polished by CMP, in order to planarize the surface where coil lead 10 and coil terminal 11 were formed in FIGS. 11A to 11C. The surface is polished at least until coil terminal 11 is exposed, in order to prevent an electrical insulation, which might be induced by the remaining insulating film on coil terminal 11, between coil lead 10 and coil 21.

Figures 13A, 13B, 13C:
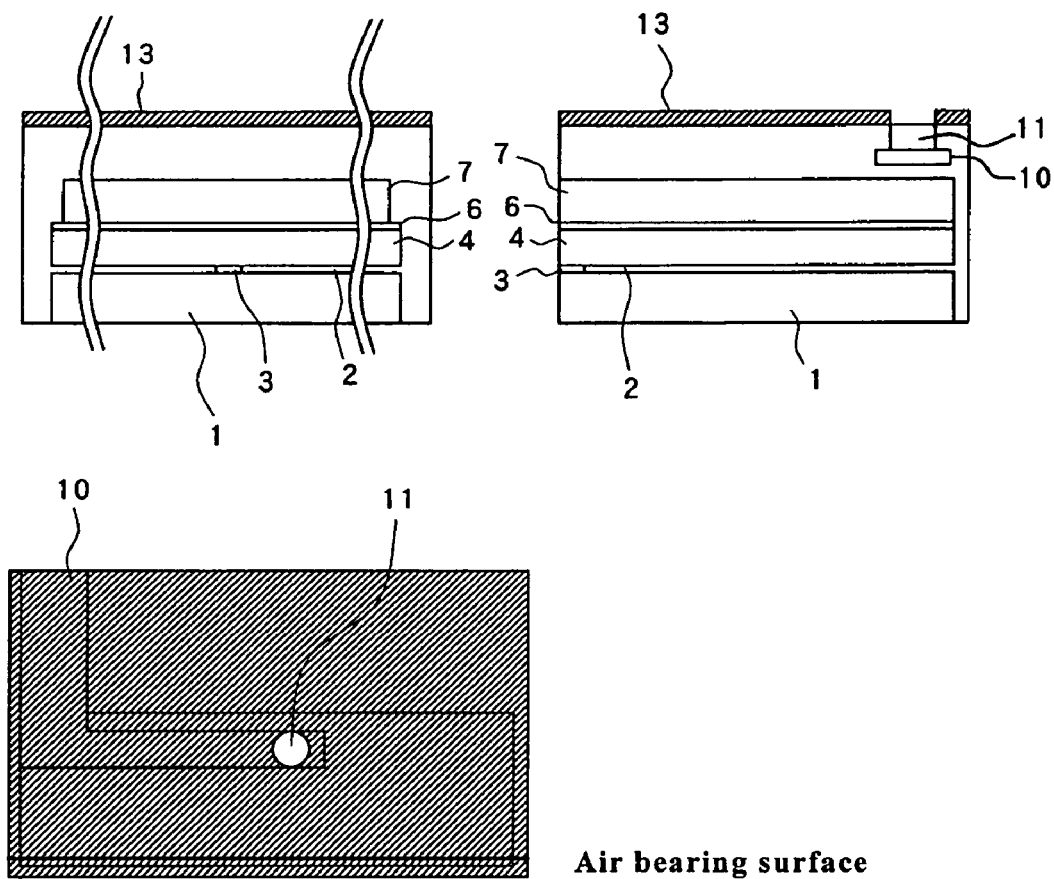
FIGS. 13A to 13C are diagrams illustrating the step for forming insulating film 13 according to an embodiment of the present invention.

As shown in FIGS. 13A to 13C, after coil terminal 11 is masked on the surface that was planarized in FIGS. 12A to 12C, insulating film 13 made of a material such as $Al_2O_3$ is formed by sputtering. Insulating film 13 is not formed on coil terminal 11 in order to prevent an electrical insulation, which might be induced by the remaining insulating film on coil terminal 11, between coil lead 10 and coil 21.

As shown in FIGS. 14A to 14C, the main magnetic pole is formed in a manner described above. Then, main magnetic pole layer 14 made of a material such as iron-cobalt alloy is formed on insulating film 13. Then, overlying layer 15, made of a material such as $Al_2O_3$, which exhibits a lower ion milling rate than the magnetic metal material which constitutes main magnetic pole layer 14, is formed on main magnetic pole layer 14. Next, main magnetic layer 14 is patterned in the shape as shown in FIG. 14C, by using overlying layer 15 or a film formed on overlying layer 15 as a mask. Then, main magnetic pole layer 14 is etched by ion-milling from a direction which forms a predetermined angle to the stacked direction. Main magnetic pole layer 14 is formed in the desired inverted trapezoid shape at the air bearing surface, because overlying layer 15 reduces the ion milling rate in the upper portion of main magnetic pole layer 14 which underlies overlying layer 15.

Figure 15C:
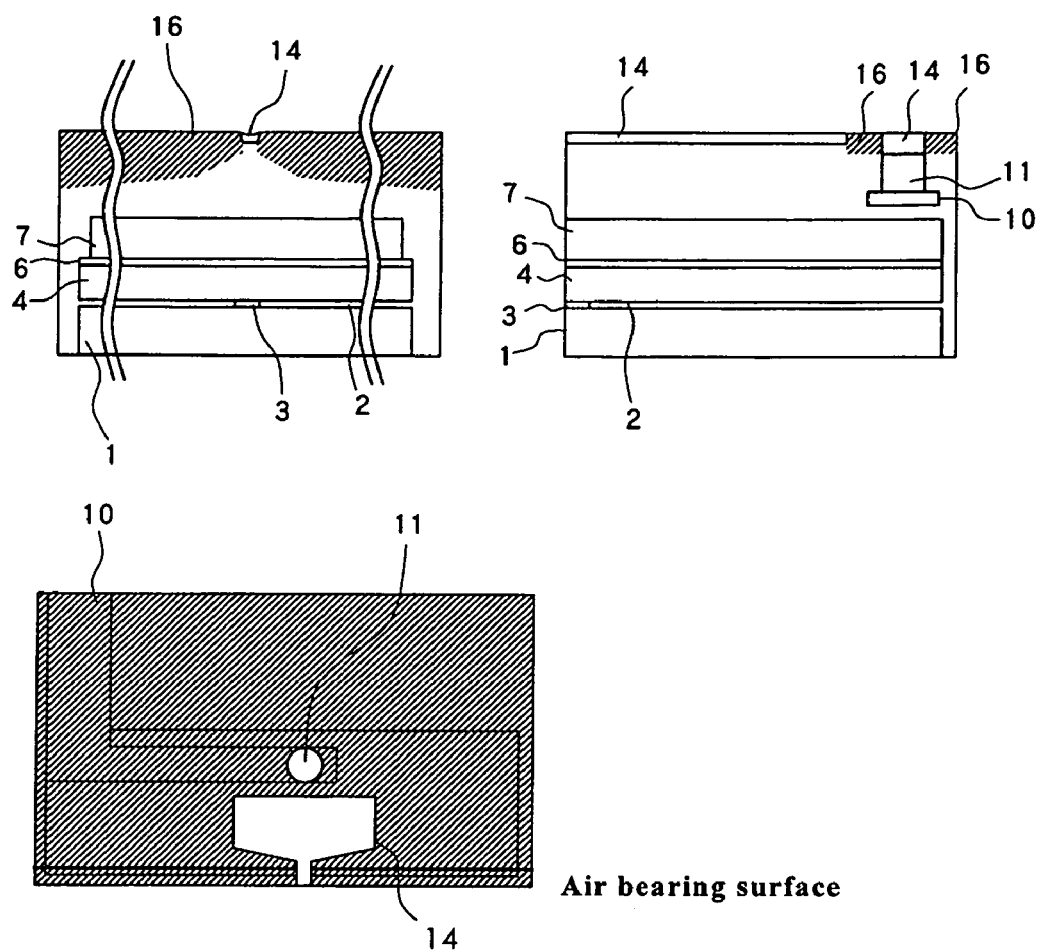

As shown in FIGS. 15A to 15C, non-magnetic film 16, made of a material such as $Al_2O_3$ or AlN, which exhibits a lower ion milling rate than the magnetic metal material which constitutes main magnetic pole layer 14, is uniformly formed by sputtering over the entire wafer, in order to form a surface that is flush with the surface of the main magnetic pole formed in FIGS. 14A to 14C. Then, the surface is polished by CMP at least until main magnetic pole layer 14 is exposed. Subsequently, the main magnetic pole is formed such that an arcuate recess is formed on the trailing edge, by etching which utilizes the difference in the ion milling rate between the magnetic metal material that constitutes main magnetic pole layer 14 and the non-magnetic material that constitutes non-magnetic film 16, as described above. The contour lines in the magnetic writing field of the main magnetic pole on the trailing edge are corrected so that they become straight lines with respect to the track width direction.

(Step 705: Formation of the upper write shield supporting layer) As shown in FIGS. 16A to 16C, after an arcuate recess was formed in the main magnetic pole on the trailing edge, and the surface was planarized in FIGS. 15A to 15C, non-magnetic film 17, made of a material such as $Al_2O_3$ or Ru, is formed by sputtering on the surface. As can be seen in FIG. 16B, areas except for those around the air bearing surface and coil terminal 11 of the main magnetic pole are masked to prevent the deposition of magnetic film 17. If non-magnetic film 17 is deposited on these areas, the magnetic connection between main magnetic pole layer 14 and the upper write shield supporting layer 18, which is deposited next, will not be established. Further, if non-magnetic film 17 is made of an electrical insulating material, the electric connection between coil 21 and coil lead 10 will not be established either. Non-magnetic film 17 forms a write gap on the air bearing surface. The thickness of non-magnetic film 17 is 200 nm or less. In this range of thickness, the magnetic shielding effect of the upper write shield can be highly expected to occur. In addition, the arcuate recess of the main magnetic pole on the trailing edge is reproduced in non-magnetic film 17, and as a result, an arcuate protrusion which conforms to the arcuate recess of the main magnetic pole on the trailing edge is naturally formed in upper write shield insulating layer 18 on the side of non-magnetic film 17, when upper write shield supporting layer 18 is deposited on non-magnetic film 17.

As shown in FIGS. 17A to 17C, upper write shield supporting layer 18 made of a material such as perm-alloy is formed by plating on the areas where non-magnetic film 17 was not deposited in FIGS. 16A to 16C and on the area adjacent to the air bearing surface of the main magnetic pole. These areas are shown in FIG. 17B. Upper write shield supporting layer 18 that is deposited on main magnetic pole layer 14 is magnetically connected to main magnetic pole layer 14, and upper write shield supporting layer 18 that is deposited on coil terminal 11 is electrically connected to coil lead 10. At the side of the air bearing surface of the main magnetic pole, an arcuate protrusion is formed in upper write shield supporting layer 18 on the side of non-magnetic film 17, with supporting layer 18 deposited on non-magnetic film 17 that defines the write gap. This arcuate protrusion conforms to the arcuate recess of main magnetic pole layer 14 on the trailing edge. Accordingly, scattering of the magnetic writing field generated by the main magnetic pole can be prevented, and the strength of magnetic field, which is weakened due to the shielded pole design, is increased in the central portion and recovered.

Figure 18A:
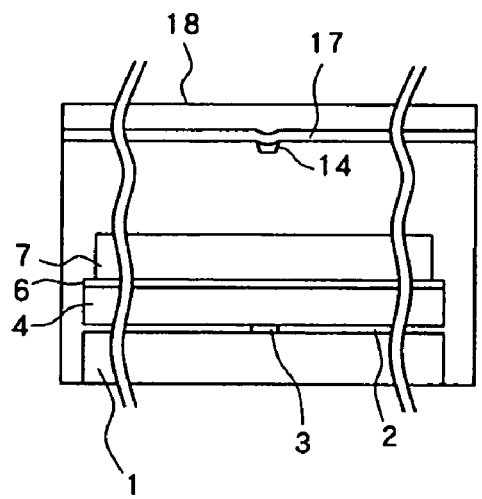
FIGS. 18A to 18C are diagrams illustrating the step for forming and polishing non-magnetic film 19 according to an embodiment of the present invention.
Figure 18B:
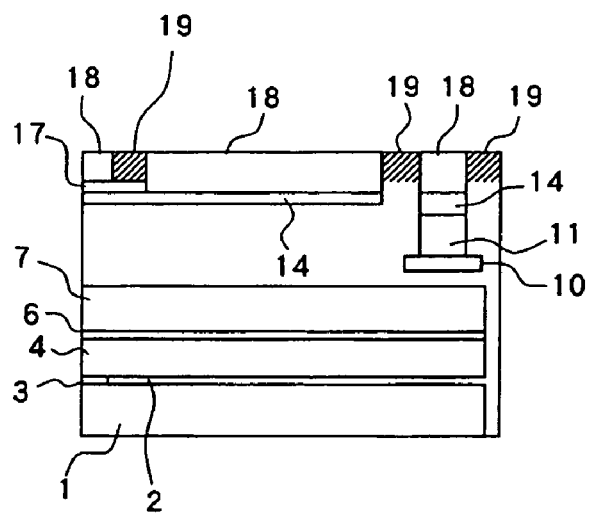
Figure 18C:
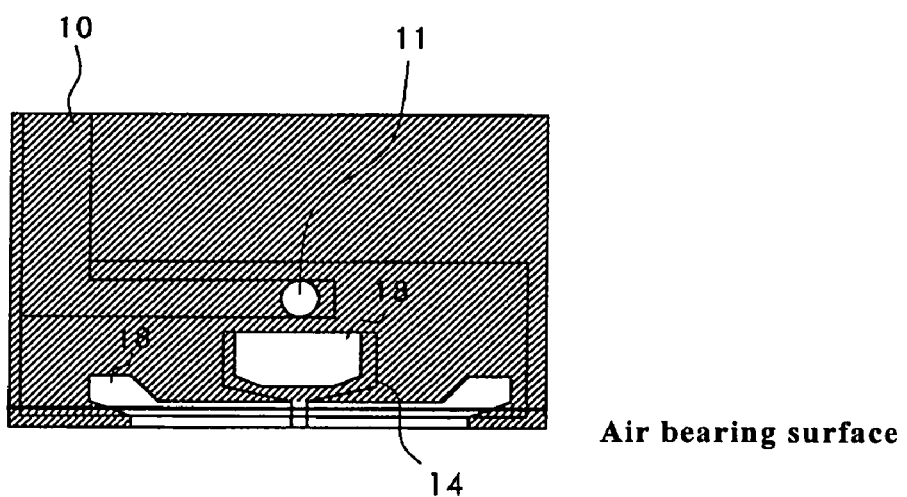

(Step 706: Formation of the coil) As shown in FIGS. 18A to 18C, first, non-magnetic film 19 made of a material such as $Al_2O_3$ is uniformly formed by sputtering over the entire wafer, and subsequently polished by CMP, in order to form a surface that is flush with upper write shield supporting layer 18 that was formed in FIGS. 17A to 17C. The surface is polished at least until upper write shield supporting layer 18 is exposed in all areas where upper write shield supporting layer 18 was formed by plating in FIGS. 17A to 17C, in order to ensure that there is a magnetic connection between upper write shield layer 23 and upper write shield supporting layer 18, and to ensure that there is an electric connection between coil 21 and coil lead 10 at the location of coil terminal 11.

Figure 19A:
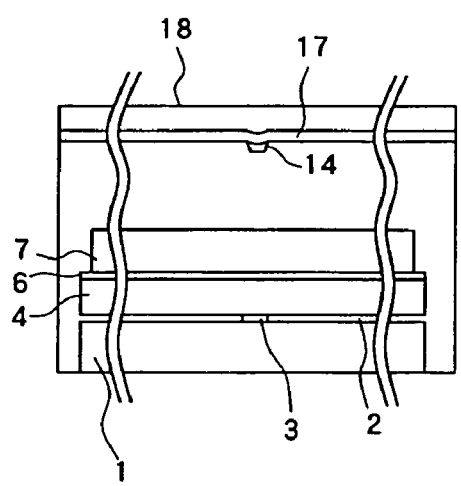
FIGS. 19A to 19C are diagrams illustrating the step for forming insulating film 20, coil 21, and coil insulating film 22 according to an embodiment of the present invention.
Figure 19B:
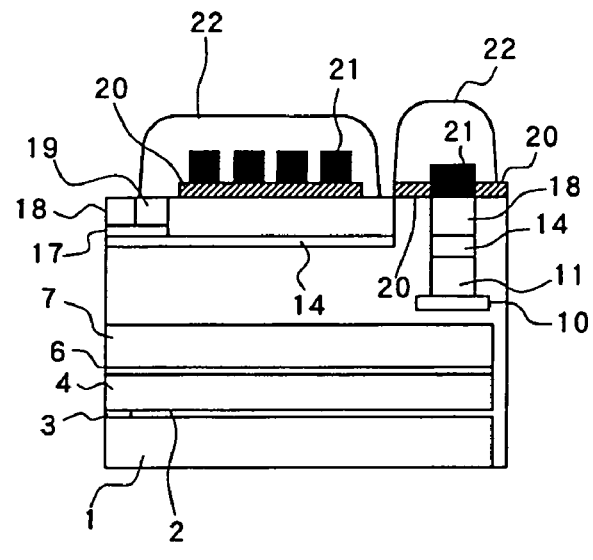
Figure 19C:
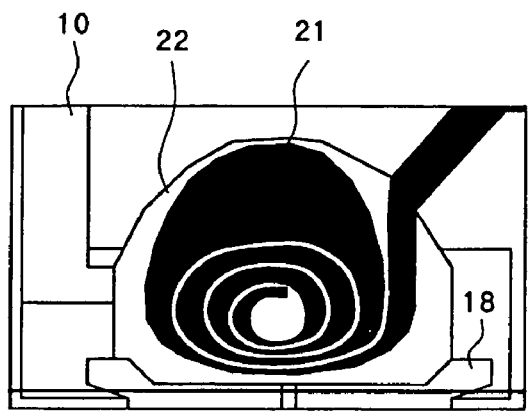

As shown in FIGS. 19A to 19C, insulating film 20 made of a material such as $Al_2O_3$ is formed by sputtering on the surface that was planarized in FIGS. 18A to 18C in order to electrically insulate upper write shield supporting layer 18 and coil 21. Then, coil 21 made of a material such as Cu is formed by plating on insulating film 20. Coil 21 is covered with coil insulating film 22, made of a material such as a photo-resist, to ensure that there is an electric insulation between the turns of coil 21. Since insulating film 20 is not formed above coil terminal 11, and coil 21 is formed in contact with upper write shield supporting layer 18, coil 21 is electrically connected with upper write shield supporting layer 18.

(Step 707: Formation of the upper write shield layer) As shown in FIGS. 20A to 20C, upper write shield layer 23, made of a material such as perm-alloy, is formed by plating such that upper write shield layer 23 is in contact with upper write shield supporting layer 18 which is exposed on the surface in FIGS. 19A to 19C. Upper write shield layer 23, together with upper write shield supporting layer 18, forms the upper write shield. The manufacturing of a magnetic head of the present invention is finished.

It should be understood that the method for manufacturing the magnetic head that is described with reference to FIGS. 8A to 20C, and the structure of the magnetic head that is described with reference to FIGS. 1A and 1B are only exemplary. It is also possible, as needed, to apply the method of the present embodiment for forming an arcuate recess in the main magnetic pole on the trailing edge, to different types of magnetic heads in order to manufacture magnetic heads having different structures. For example, the main magnetic pole does not have to be formed in an inverted trapezoid shape at the air bearing surface, or the shielded pole design does not have to be employed.

Although certain preferred embodiments of the present invention have been shown and described in detail, it should be understood that various changes and modifications may be made without departing from the spirit or scope of the appended claims.

What is claimed is:

1. A method for manufacturing a magnetic head for perpendicular magnetic recording in which a main magnetic pole has an arcuate recess on a trailing edge of the magnetic head, the method comprising:
   a first step of depositing a non-magnetic film over and around the main magnetic pole which was patterned in advance, such that the main magnetic pole is embedded within the non-magnetic film, and subsequently polishing and planarizing the non-magnetic film until the main magnetic pole is exposed, wherein the non-magnetic film is made of a non-magnetic material which exhibits a lower ion milling rate than an ion milling rate of a magnetic metal material which constitutes the main magnetic pole;
   a second step of etching a surface that is polished and planarized at the first step, by means of ion milling, from a direction which forms a first angle relative to a stacked direction of the magnetic head, to form a stepped portion in which the main magnetic pole is lower from the non-magnetic film around the main magnetic pole; and
   a third step of etching the stepped portion, by means of ion milling, from a direction which forms a second angle relative to the stacked direction, wherein the second angle is larger than the first angle.

2. The method according to claim 1, further comprising, prior to the first step, a fourth step of forming the main magnetic pole which was patterned in advance in an inverted trapezoid shape at a side of an air bearing surface of the magnetic head.

3. The method according to claim 1, wherein the non-magnetic material is selected from the group comprising $Al_2O_3$ and AlN.

4. The method according to claim 1, wherein the first angle ranges from 0 degree to 50 degrees.

5. The method according to claim 1, wherein the second angle ranges from 55 degrees to 80 degrees.

6. The method according to claim 1, further comprising:
   a step of depositing a write gap film on the main magnetic pole and on the non-magnetic film around the main magnetic pole after the third step, wherein the write gap film has a thickness of 200 nm or less and is made of a second non-magnetic material; and
   a step of forming a write shield made of a second magnetic metal material on the write gap film after the step of depositing the write gap film.

* * * * *